UNITED STATES PATENT OFFICE.

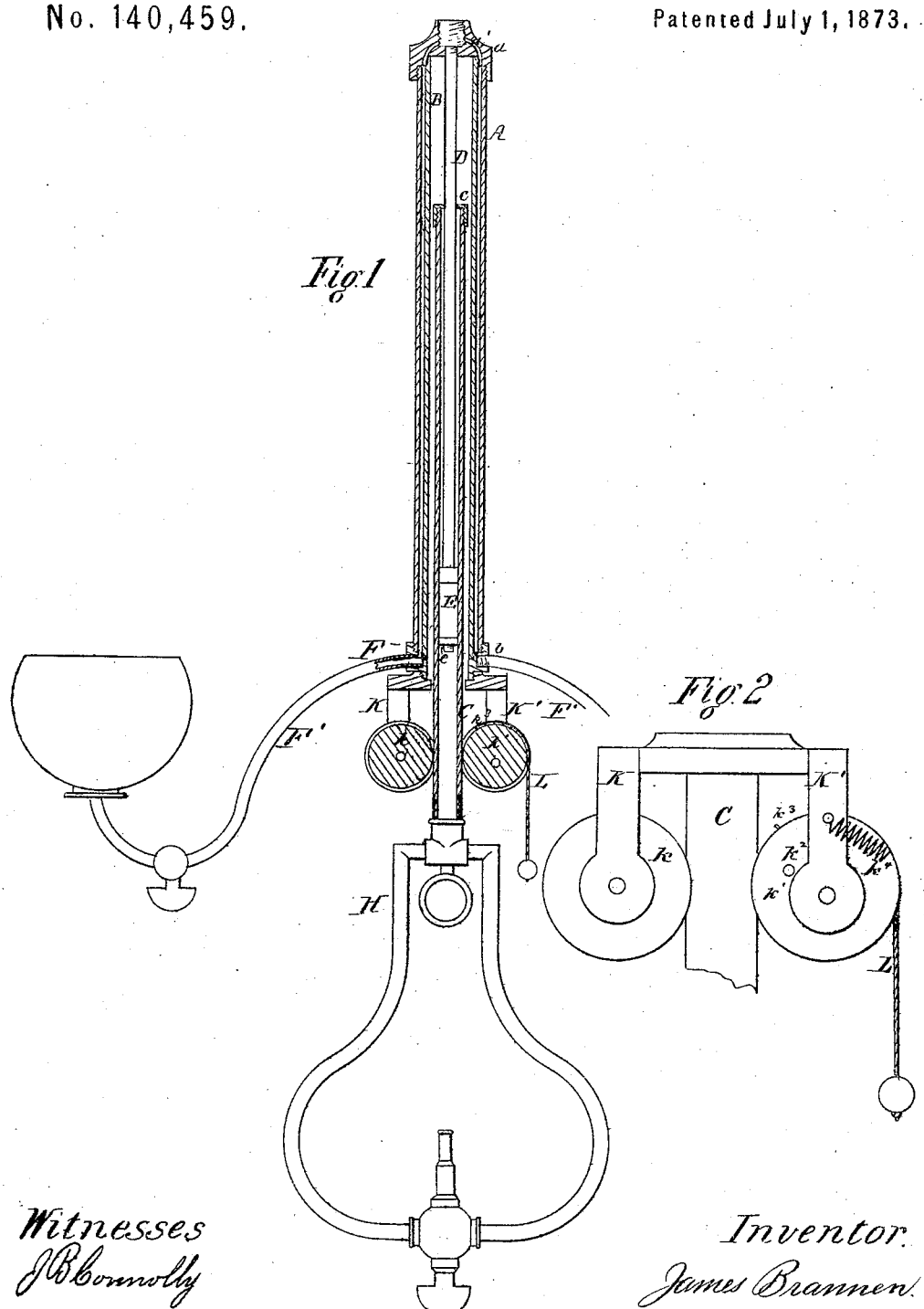

JAMES BRANNEN, OF PHILADELPHIA, PENNSYLVANIA.

IMPROVEMENT IN SLIDING OR EXTENSION CHANDELIERS.

Specification forming part of Letters Patent No. 140,459, dated July 1, 1873; application filed March 27, 1873.

*To all whom it may concern:*

Be it known that I, JAMES BRANNEN, of Philadelphia, in the county of Philadelphia and State of Pennsylvania, have invented certain new and useful Improvements in Sliding or Extension Chandeliers and Lamps; and I do hereby declare the following to be a full, clear, and exact description of the invention, such as will enable others skilled in the art to which it pertains to make and use it, reference being had to the accompanying drawings, which form part of this specification.

Referring to the drawings, Figure 1 is a vertical central section of my invention, and Fig. 2 is a detail view.

My invention has reference to sliding or extension chandeliers and lamps. The object of my invention is to so construct the chandelier or lamp that the harp or part which it is desired to raise and lower, in order to serve as a drop-light or for any other purpose, may be readily raised by a simple upward push, and will be retained in any desired position, or lowered, by means hereinafter to be described. A further object of my invention is to keep the sliding pipe clean by preventing its outside surface from coming in contact with the gas. My invention consists in the construction, combination, and arrangement of the several parts, having reference particularly, first, to the combination of the sliding pipe with an eccentric or eccentrics, so arranged that the pipe may be readily slid up, but which will bind and hold the pipe from sliding down unless said eccentric or eccentrics be retracted by means provided for that purpose; second, to the combination of the sliding pipe with an inner pipe for supplying gas to the harp, said inner pipe being provided at its lower extremity with a packing of suitable material fitting the inside of the supply-pipe; third, to the combination of the sliding pipe and the pipe which conveys gas to the branches with an intermediate or partition pipe, which prevents the gas in said supply-pipe from coming in contact with the outer surface of the sliding pipe.

Referring to the accompanying drawing, which illustrates a chandelier constructed with my improvements, A is the main pipe of the chandelier, screwed into a head or disk, $a$, provided with openings $a'$ to permit the passage of the gas. Said pipe and disk may be united by a screw-joint or by soldering, preferably by the former. B represents a partition-pipe, which is also screwed into the disk $a$ inside of the pipe A, as shown, and serves to prevent the gas passing through said latter pipe from coming in contact with the outside surface of pipe C. D is another pipe screwed, as shown, into the disk $a$, and is designed for supplying gas to the harp. C is the sliding pipe, provided with a screw-cap, $c$, which serves as a guide in sliding said pipe upon the pipe D. E shows a packing of felt or other suitable material, secured in place upon the pipe D by the nut $e$. This packing is stationary, and fits inside of the pipe C, whereby the gas passing through D is kept from contact with the outside of pipe C. Were the packing on C, and this pipe arranged to slide inside of pipe D in the usual manner, the outside of said pipe C would become foul from contact with the gas.

I am aware that means have already been employed for the purpose of conducting the gas to the branches of an extension chandelier so that it shall not come in contact with the adjustable tube, as shown, for instance, in the patent to C. Deavs, granted July 19, 1870; hence I do not, broadly, claim this feature.

F is the body of the chandelier, having suitable openings $b$ for the branches F', which communicate with pipe A, as shown. The pipes A and B are screwed into the body F, which has a central opening for the passage of the sliding pipe C. H is the harp secured to said sliding pipe C. K K' are arms dependent from the body F sustaining the grooved pulleys $k$ $k^1$, one of which pulleys is an eccentric, or both may be eccentrics, if preferred. $k^2$ is a stop or pin on the eccentric, which meets the arm K' to prevent said eccentric from turning too far. $k^3$ is a pin on the periphery of the eccentric, to which is secured a cord, L, for turning the eccentric so as to permit the sliding of the pipe C; and $k^4$ is a spring for returning the eccentric to position after the strain exerted upon the cord L is withdrawn.

By this construction and arrangement it will be observed that the harp may be readily raised without difficulty, and will be caught automatically and sustained in position by the eccentric.

When it is desired to lower the harp the cord L must be drawn in order to retract the eccentric.

The body F will, of course, be covered by a shell of suitable design, hiding the eccentric and arms from view, and pierced to allow the passage of the cord L, which may run upon a small pulley on one of the branches.

Instead of the roller shown at $k$, a grooved block or equivalent device, which will serve to steady and guide the sliding pipe, at the same time permitting it to be easily moved, may be employed.

What I claim as my invention is—

1. The combination, with the sliding pipe C, of the eccentric or eccentrics $k^1$, the latter being so constructed and arranged that it will, by frictional contact or pressure upon the surface of said pipe, prevent it from being lowered until the pressure is withdrawn, substantially as specified.

2. The stationary pipe D, having the adjustable packing E on its lower end, in combination with the nut $e$ and the sliding pipe C, substantially as and for the purpose specified.

3. The combination, with the extension chandelier having the adjustable pipe C, central tube D, and casing-pipe A, of the partition-pipe B, located between the adjustable and casing pipes so as to include the former, substantially as shown and described.

4. The combination, with the extension chandelier having the adjustable pipe C, central tube D, and casing-pipe A, of the partition-pipe B, having its ends threaded, as shown, and thereby so secured to the body F and cap $a$ that it may be readily removed and replaced without injury to the chandelier, substantially as and for the purpose specified.

In testimony that I claim the foregoing I have hereunto set my hand this 22d day of March, 1873.

JAMES BRANNEN.

Witnesses:
  M. DANL. CONNOLLY,
  T. J. M. TIGHE.